(12) United States Patent
Dupuis

(10) Patent No.: US 7,100,746 B2
(45) Date of Patent: Sep. 5, 2006

(54) MOTOR VEHICLE DRUM BRAKE AND RELATED ASSEMBLING METHOD

(75) Inventor: Vincent Dupuis, St Maur des Fosses (FR)

(73) Assignee: Robert Bosch GmbH, Stuttgart (DE)

( * ) Notice: Subject to any disclaimer, the term of this patent is extended or adjusted under 35 U.S.C. 154(b) by 85 days.

(21) Appl. No.: 10/513,628

(22) PCT Filed: Apr. 25, 2003

(86) PCT No.: PCT/EP03/04311

§ 371 (c)(1),
(2), (4) Date: Nov. 5, 2004

(87) PCT Pub. No.: WO03/095859

PCT Pub. Date: Nov. 20, 2003

(65) Prior Publication Data
US 2005/0173208 A1    Aug. 11, 2005

(30) Foreign Application Priority Data
May 7, 2002 (FR) .................................. 02 05768

(51) Int. Cl.
*F16D 55/00* (2006.01)
(52) U.S. Cl. ................ 188/73.32; 188/325; 188/73.33; 188/79.55
(58) Field of Classification Search .................. 188/78, 188/73.32, 73.33, 79.55, 79.58, 79.51, 331, 188/325–328, 341
See application file for complete search history.

(56) References Cited

U.S. PATENT DOCUMENTS

| 3,708,044 A | * | 1/1973 | Torri et al. ................. 188/326 |
| 4,015,693 A | * | 4/1977 | Hayashida et al. ....... 188/79.54 |
| 5,275,260 A | * | 1/1994 | Evans et al. ............. 188/79.64 |
| 6,131,708 A | * | 10/2000 | Fujiwara ................. 188/250 E |
| 6,390,248 B1 | * | 5/2002 | Ikeda ....................... 188/79.55 |
| 6,554,110 B1 | * | 4/2003 | Asai et al. ..................... 188/78 |

FOREIGN PATENT DOCUMENTS

| DE | 2009241 | 9/1971 |
| DE | 2949506 A1 | 8/1979 |
| EP | 0843109 A2 | 5/1999 |

* cited by examiner

*Primary Examiner*—James McClellan
*Assistant Examiner*—Mariano Sy
(74) *Attorney, Agent, or Firm*—Leo H McCormick, Jr.; Sarah Taylor

(57) ABSTRACT

In order to facilitate assembly and disassembly of a vehicle, the invention provides a method of assembling and disassembly a drum brake (1). In this assembly and disassembly method, the operating spacing of two brake shoes (4 and 5) inside a drum brake (3) is pre-adjusted. The invention makes it possible for the drum brake (1) to be delivered with the brake shoes (4 and 5) in a position where they are clamped against each other, corresponding to assembly clearance, while potentially retaining the spacing needed to match the operating clearance of the drum brake. A single action (A, B) on the hand-brake lever (6) enables the shoes to be moved from assembly clearance to operating clearance.

6 Claims, 3 Drawing Sheets

MOTOR VEHICLE DRUM BRAKE AND RELATED ASSEMBLING METHOD

The present invention relates to a vehicle drum brake, and to an associated method of assembling it. The invention seeks to improve mass production assembly of drum brakes on vehicles. The invention also seeks to facilitate replacing worn drum brakes.

BACKGROUND OF THE INVENTION

A drum brake comprises a drum and a brake backing plate. The drum and the backing plate are circular in shape. The backing plate is designed to be inserted in the drum.

A drum brake is fixed firstly concentrically to the rim of at least one wheel of a vehicle by means of the drum. The drum brake is also fixed to an axle of the vehicle via the backing plate.

The drum and the backing plate come into contact with each other via two brake shoes. The two brake shoes are in the form of circular arcs and they are disposed diametrically opposite each other. Together they define a circle of a certain diameter. On the outside faces of the brake shoes, and facing the overlying periphery of the drum, there is disposed a brake lining. The brake lining is designed to be pressed against the overlying periphery of the drum in order to brake the wheel of the vehicle. Each of the two shoes has hinged thereto a hand-brake lever and a lever for taking up slack. The hand-brake lever is pulled by a hand-brake cable, and the cable is actuated under the control of a driver. The hand-brake lever is designed to exert force on each of the shoes in such a manner as to cause the shoes to move apart from each other and press against the overlying periphery of the drum. The slack-takeup lever is designed to move the two brake shoes towards the periphery of the drum as the brake linings become worn.

In some cases, a brake actuator can be installed at one end of the shoe, at the location where two brake shoes meet. The brake actuator is also designed to exert force on both shoes, in response to the driver depressing a brake pedal, so that the shoes move apart from each other and come to press against the periphery of the drum.

A brake drum is assembled by inserting the backing plate carrying the two brake shoes, the hand-brake lever, the slack-takeup lever, and the braking actuator into the inside of the drum. Such assembly requires assembly clearance for the two brake shoes. The assembly clearance of the two brake shoes corresponds to a distance between a given point on the periphery of the drum and a corresponding other point on the circle defined by the two brake shoes, with the average distance needed to enable the two brake shoes to be inserted inside the drum being about 0.8 millimeters (mm). Once inside the drum, the two brake shoes need to be moved apart so as to take up operating clearance. Operating clearance corresponds to the optimum spacing for the brake shoes relative to the diameter of the drum. This optimum spacing is such that at rest there is no contact between the brake shoes and the drum. Nevertheless, this optimum clearance must be close enough to the overlying periphery of the drum so that for a given level of braking, braking takes place relatively immediately. By way of example, the operating clearance or the distance between the outside diameter of the brake shoes and the diameter of the drum is about 0.3 mm to 0.4 mm.

To go from assembly clearance to operating clearance, it is known to make use of the brake pedal and the brake actuator. For this purpose, an operator applies several consecutive presses to the brake pedal, thereby causing hydraulic action to be taken. While this hydraulic pressure is being applied, the brake shoes move apart from each other, and the slack-takeup device engages a non-return ratchet which little by little prevents the shoes from returning to a rest position that is too far away. Several applications of hydraulic pressure are needed and they are performed at the end of the assembly line. In one example, the operator needs to apply hydraulic pressure a score of times using the brake actuator in order to reduce the assembly clearance from about 0.8 mm to an operating clearance of 0.3 mm to 0.4 mm. Applying hydraulic pressure in this way is tedious.

In addition, over time with the drum brake being used, the brake linings wear. The brake linings become worn because they are pressed against and rub against the periphery of the drum during braking. The distance between a point on the circle defined by the brake shoes and a corresponding point on the periphery of the drum increases. This distance is subsequently regularly re-adjusted, to within operating clearance, by the slack-takeup lever.

However, the friction between the brake linings and the periphery of the drum can over time, and because of use, lead to the wall of the drum being dug away. This forms a step in the wall of the drum. Because such a step is formed and because of the increase in the spacing between the two brake shoes due to automatic and regular readjustment of the distance between the circle defined by the brake shoes and the periphery of the drum, it can become more difficult, or even impossible to extract the two brake shoes from the drum.

SUMMARY OF THE INVENTION

Under such circumstances, in order to facilitate assembly on an assembly line in such a manner as to reduce the number of time hydraulic pressure needs to be applied in order to adjust to operating clearance, the invention proposes an assembly method such that the spacing between the two brake shoes is pre-adjusted in the factory to a given operating clearance. Thus, in the invention, the operations to be performed on the assembly line are made much easier because the operator no longer needs to perform hydraulic adjustment in order to bring the spacing between the two brake shoes to the operating clearance. It suffices to act once on the hand brake in order to go from assembly clearance to operating clearance.

In order to facilitate assembly line operation, so that it is easier to insert the two brake shoes into the drum, the invention thus provides an assembly method enabling the brake shoes to be inserted into the drum with assembly clearance that is larger. To do this, the two brake shoes are pressed against each other so that the diameter they define is reduced.

In order to make a drum brake easier to disassemble, so as to make it possible to extract the brake shoes from the drum, particularly after the wall of the drum has had a step dug out therein, the invention provides a disassembly method. According to the invention, the disassembly method is such that because of a slot present in the drum and an abutment present on the hand-brake lever, it is possible to extract the two drum brake shoes from the drum by urging them towards each other. Moving the two brake shoes towards other amounts to reducing the diameter of the circle they define.

The invention thus provides a drum brake for a vehicle wheel, the brake comprising a backing plate, a drum, two brake shoes, and a hand-brake lever hinged to one of the two brake shoes, and being characterized in that:

the backing plate and/or the drum is/are provided with an opening placed over the location where the hand-brake lever is situated making it possible to access said opening from outside the backing plate and/or the drum to lift and/or pull the lever relative to the brake shoe on which it is hinged; and the hand-brake lever is provided on one of its faces for facing one of the brake shoes with an abutment that co-operates with one of the two shoes.

The invention also provides a method of assembling a drum brake, the method being characterized in that it comprises the following steps:

in the factory, adjusting the spacing of two brake shoes to an operating clearance corresponding to a reference drum;

lifting a hand-brake lever from the brake shoe to which the hand-brake lever is hinged, and then pushing the hand-brake lever towards an outer rim of said shoe;

placing the shoes in a brake backing plate of a vehicle wheel;

connecting a hand-brake cable to the lever; and using the hand-brake cable to pull on the hand-brake lever so as to replace an abutment present on the hand-brake lever against an inner rim of the shoe on which the lever is hinged.

The invention also provides a method of dissembling a drum brake, the method being characterized in that it comprises the following steps:

starting with a hand-brake lever of said drum brake in a position such that an abutment present on said lever is engaged against an inner rim of a first brake shoe of said drum brake, the lever being hinged to said first shoe; then spacing the lever apart from the first shoe on which it is hinged in a direction parallel to an axis of said hinge; then pushing the hand-brake lever towards an outer rim of the first shoe; and extracting a drum of said drum brake from a backing plate of said drum brake which carries the first shoe and the lever.

The invention will better understood on reading the following description and on examining the accompanying figures. The figures are given purely by way of indication with no limiting effect on the invention.

DETAILED DESCRIPTION OF THE INVENTION

Figure 1:
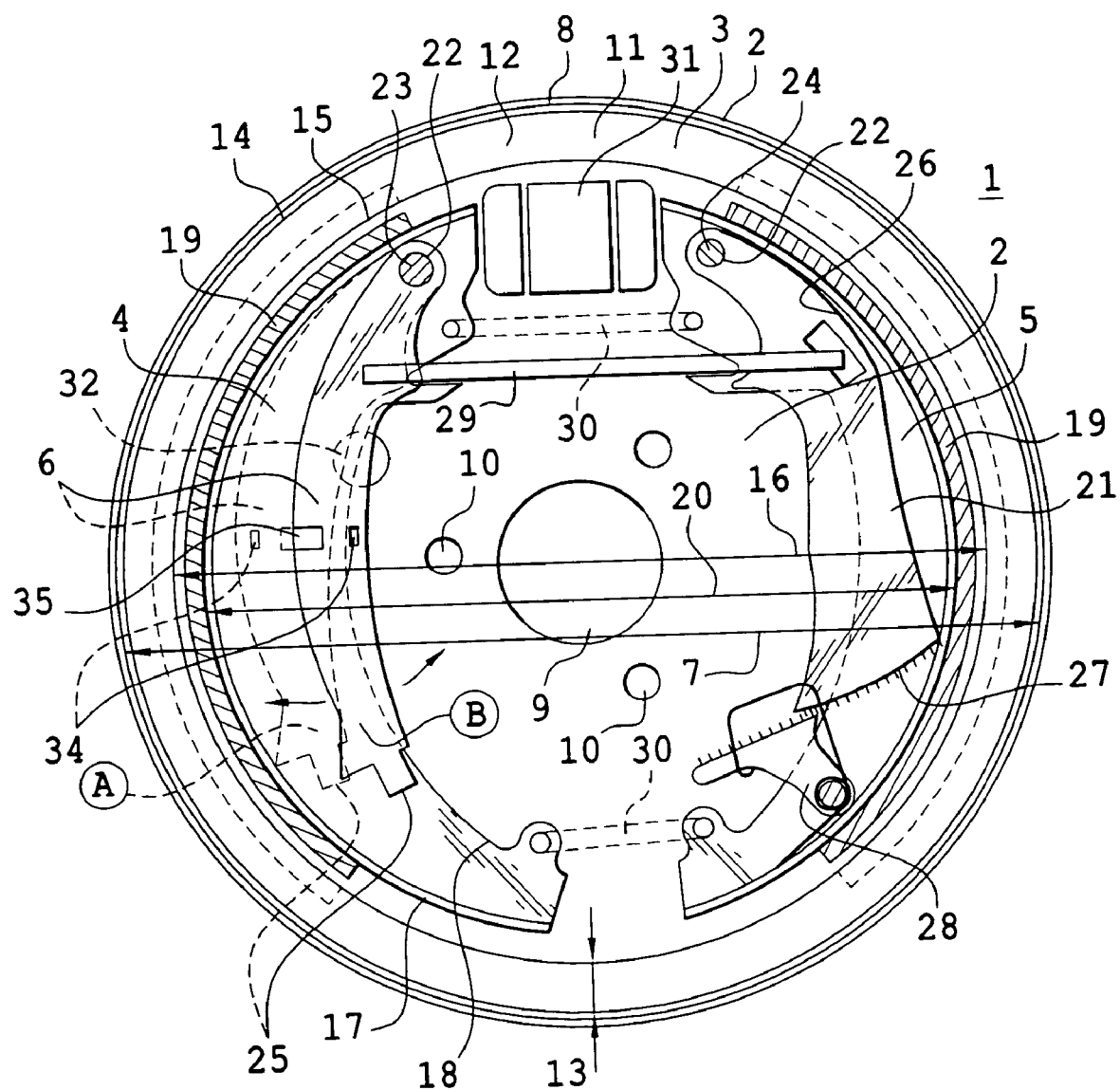
FIG. 1 is a diagram of a drum brake of the invention.

A drum brake 1 for a vehicle wheel comprises, in accordance with the invention, and as shown in FIG. 1, a backing plate 2, a drum 3, two brake shoes 4 and 5, and a hand-brake lever 6 hinged to one of the two brake shoes 4 and 5, in this case the shoe 4.

The backing plate 2 is circular in shape having a diameter 7 and having it periphery 8 folded through a right angle. The plate 2 includes a central hole 9 for receiving a wheel shaft (not shown). The plate 2 has other holes 10 of smaller size for receiving bolts for fixing the plate 2 to an axle of the vehicle.

Inside the plate 2 (FIG. 1) there are two circularly arcuate brake shoes 4 and 5 occupying a circle one after the other. Between these two shoes 4 and 5 and the periphery 8 of the plate 2 there is inserted a drum 3. The drum 3 possesses a periphery 11 which is the part of the drum 3 that is inserted inside the plate 2. The drum 3 has a wall 12 extending perpendicularly to the plane of the drum 3 and having thickness 13. The wall 12 of the drum 3 has an outside face 14 and an inside face 15. The outside face 14 is designed to face the periphery 8 of the plate 2. The inside face 15 is designed to face the two shoes 4 and 5. The drum 3 has a diameter 16 at the inside face 15 of the wall 12.

Each of the two flat shoes 4 and 5 has an outer rim 17 at right angles and an inner rim 18. The rim 17 is situated facing the periphery 11 of the drum 3. On the rim 17 of each of the shoes 4 and 5 there is disposed a brake lining 19. The brake lining 19 is designed to press against the inside face 15 of the wall 12 of the drum 3 during braking. Together the two shoes 4 and 5 define a diameter 20 by means of their outer rims 17, which diameter 20 is smaller than the diameter 16 of the drum 3.

The brake shoes 4 and 5 carry respectively the hand-brake lever 6 and a slack-takeup lever 21. The levers 6 and 21 are hinged to the shoes 4 and 5 via respective pins such as 22. The resulting hinges 23 and 24 are placed facing each other, at one of the ends of each of the shoes 4 and 5 and in such a manner that the ends thereof that are remote from the ends presenting the hinges 23 and 24 can move into contact with each other when the shoes pivot about the hinges 23 and 24 about pivot axes perpendicular to the plane of FIG. 1.

On the hand-brake lever 6 and at its end remote from the hinge 23 there is a hook 25. The hook 25 allows the hand-brake lever 6 to be pulled by a hand-brake cable (not shown).

The slack-takeup lever 21 is hinged to the shoe 5. At the location where the lever 21 is hinged, and facing the outer rim 17 of the shoe 5, there is a shoulder 26. A gear device, e.g. a series of teeth, is present at the end 27 of the lever 21 opposite from its end where it is hinged. This end 27 is of shape complementary to a device 28 for automatic adjustment in which it can engage, said device comprising, for example, likewise a series of teeth. By means of the device 28, this end 27 serves to adjust the spacing of the two shoes 4 and 5 relative to the diameter 16 of the drum 3 as the brake linings 19 and the wall 12 wear away.

The two brake shoes 4 and 5 are both connected to a link 29. The link 29 enables the brake shoes to be moved apart and allows them to be maintained at a certain distance from each other corresponding to the diameter 20. During assembly, when the (large) assembly clearance is present, the brake shoes 4 and 5 are close to each other. In use, when the operating clearance is present, they are held further apart from each other. At each of its two ends, the link 29 has a respective fork (not shown). At the ends of the link 29, the forks are designed to be placed astride the brake shoe 4 together with the hand-brake lever 6 at one end, and the brake shoe 5 together with the adjustment lever 21 at the other end. The shoes 4 and 5 have projections for securing the link 29.

The two shoes 4 and 5 are also held together by return springs such as 30 situated on the brake shoes 4 and 5 at the location of the two hinges 23 and 24 and at their two ends remote from the hinges 23 and 24. The springs 30 urge the two brake shoes 4 and 5 towards a rest position after they have been moved apart.

Between the two hinges 23 and 24, there is disposed a braking actuator 31. This braking actuator is designed to move the two brake shoes 4 and 5 apart from each under hydraulic drive so as to press the brake linings 19 against the periphery 11 of the drum 3.

In accordance with the invention, the backing plate 2 also has an opening 32 situated towards the periphery 8 of the plate 2 and in register with the location where the hand-brake lever 6 is situated. As explained below, this opening 32 makes it possible to extract the brake shoes 4 and 5 from the drum. The opening 32 is situated beneath the hand-brake lever 6 in such a manner as to enable an operator to gain access from outside the backing plate 2 to lift the hand-brake lever 6 relative to the brake shoe 4 on which it is hinged.

Figure 3:
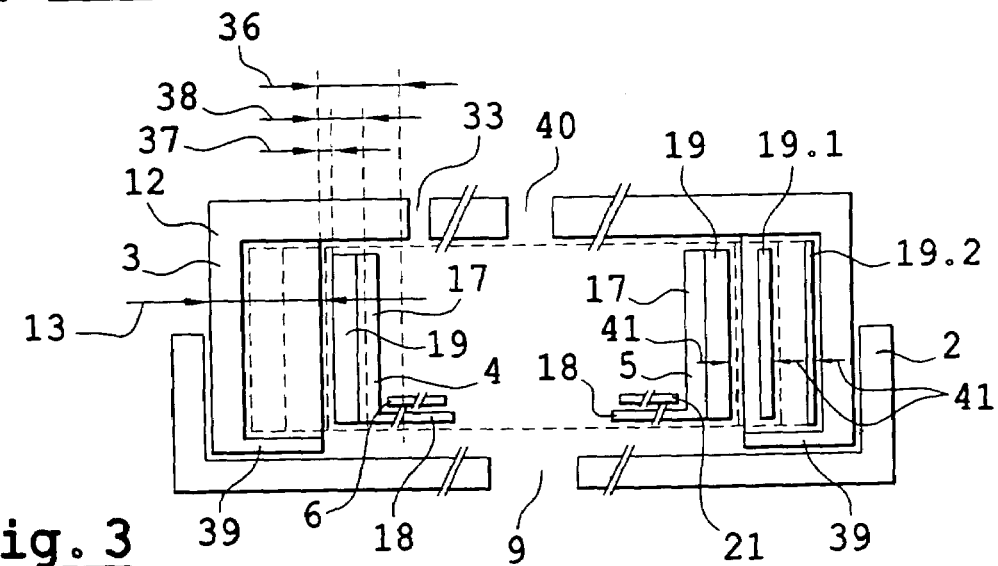
FIG. 3 is a section view of a drum brake of the invention.

In accordance with the invention, the drum 3 may include, likewise or instead, an opening 33 (FIG. 3). This opening 33 also makes it possible to extract worn shoes 4 and 5 from the drum 3. This opening 33 is situated in register with the hand-brake lever 6 in such a manner as to enable an operator to gain access from the outside of the drum 3 to move the hand-brake lever 6, e.g. by pulling the hand-brake lever 6 by means of a hooked tool.

In accordance with the invention, and as shown in FIGS. 1, and 2a to 2c, the hand-brake lever 6 also has an abutment 34 situated on one of its faces that is to come up against the brake shoe 4 between the hinge 23 and the hook 25. This abutment 34 is made, for example, by stamping the hand-brake lever 6. The stamping is performed in such a manner that a portion of the wall of the hand-brake lever 6 is pushed down so as to form a setback having a certain depth. This setback corresponding to the abutment 34 serves to co-operate with the shoe 4.

Figure 4B:
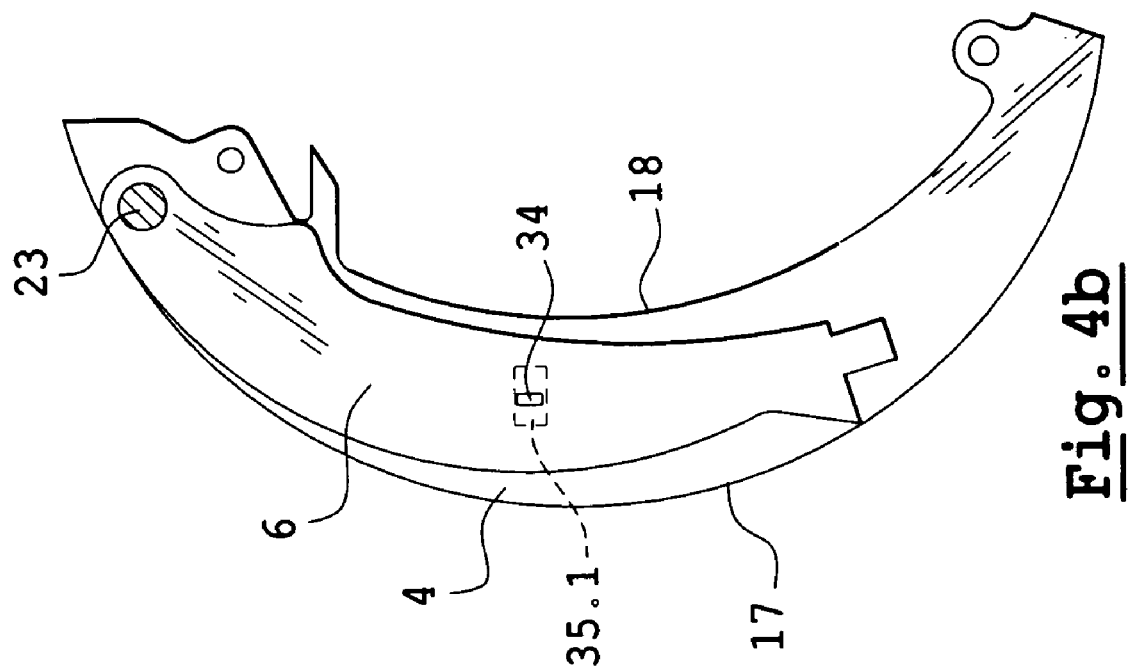
FIGS. 4a and 4b are diagrams showing co-operation between an abutment of a hand-brake lever and a brake shoe in two embodiments of the invention.
Figure 4A:
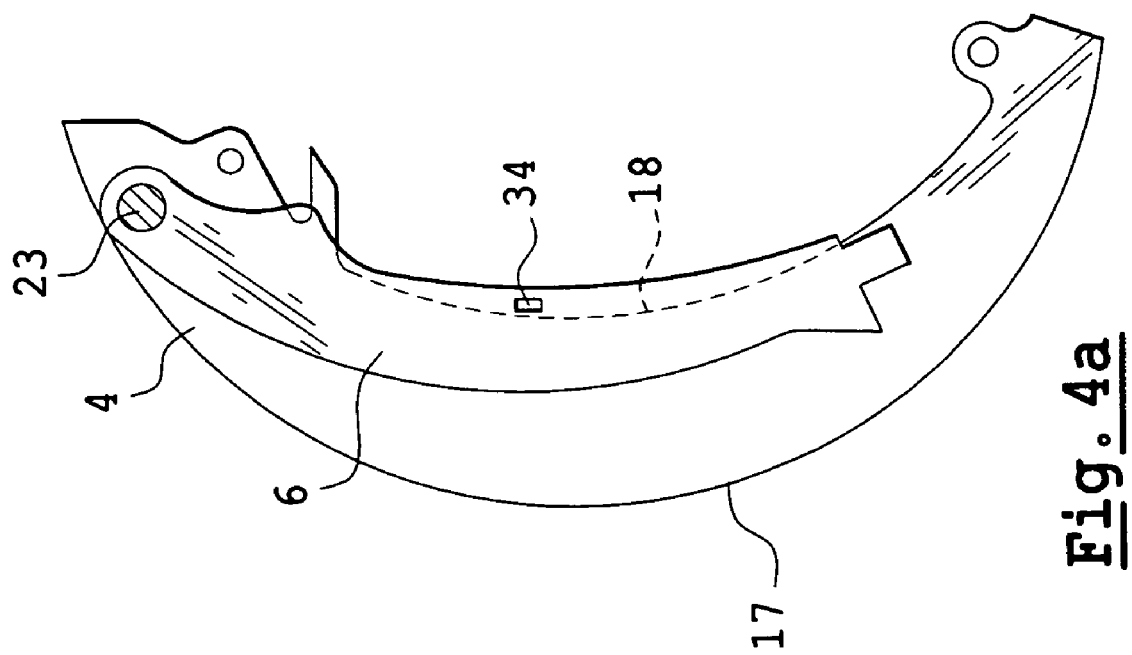

The abutment 34 is designed to co-operate with the flank of the shoe 4 in two embodiments of the invention as shown in FIGS. 4a and 4b. In a first embodiment of the invention, as shown in FIG. 4a, the abutment 34 co-operates with the flank of shoe 4 by bearing against the inner rim 18 of the shoe 4. Alternatively, in a second embodiment of the invention, as shown in FIG. 4b, the abutment 34 co-operates with the shoe 4 by being mounted in an opening 35 made in the shoe 4. Inside the opening 35, the abutment 34 can thus bear against a portion of a periphery 35.1 of the opening 35. In which case, moving the abutment 34 radially from one portion of the periphery 35.1 of the opening 35 to another portion of the same periphery 35.1 allows the abutment 34 to move over a certain stroke inside the opening 35. This stroke of the abutment 34 inside the opening 35 thus allows the hand-brake lever 6 to move through a certain stroke about the hinge 23.

Thus, in the invention, the hand-brake lever 6 can take up two positions A and B as shown in FIG. 1. In position A, the hand-brake lever 6 is pushed back to the outer rim 17 of the shoe 4 with the abutment 34 resting against the shoe 4 (cf. FIG. 2c). In position A, the hand-brake lever 6 enables the two brake shoes 4 and 5 to be pressed against each other, thereby reducing the diameter 20 when in this position A.

In position B, the hand-brake lever 6 is pressed against the shoe 4 in one or other of the two ways described above with reference to FIGS. 4a and 4b. In particular, in the first embodiment of the invention as shown in FIGS. 1 and 4a, the hand-brake lever 6 presses against the inner rim 18 of the shoe 4 via the abutment 34. Alternatively, in the second embodiment of the invention as shown in FIG. 4b, the hand-brake lever 6 presses via the abutment 34 which is received in the opening 35. In position B, the hand-brake lever 6 holds the two brake shoes 4 and 5 so that in this position B they define a diameter corresponding to the given operating clearance, in accordance with the invention.

In the invention, inserting the brake shoes 4 and 5 into a drum 3 requires both an assembly clearance 36 and an operating clearance 37 of the two brake shoes 4 and 5 relative to the diameter 16 of the drum 3. FIG. 3 shows the assembly clearance 36 and also the operating clearance 37 of a drum brake 1 of the invention, shown in section. In accordance with the invention, the assembly clearance 36 of the drum brake is greater than the assembly clearance 38 of a conventional drum brake. A conventional assembly clearance 38 corresponds to the distance between a point on the periphery 11 of the drum 3 and a corresponding point on the circle defined by the two brake shoes 4 and 5 of diameter 20, when said two brake shoes 4 and 5 are not pressed against each other. The assembly clearance 36 in accordance with the invention corresponds to the distance between a point on the diameter 16 of the drum 3 and a corresponding point on the circle defined by the two brake shoes 4 and 5 of diameter 20 when the brake shoes 4 and 5 are pressed against each other. By virtue of this greater assembly clearance 36 in accordance with the invention, it is easy to insert the two brake shoes 4 and 5 without the shoes 4 and 5 coming into abutment against the wall 12 of the drum 3.

In accordance with the invention, the operating clearance 37 of the drum brake 1 serves, once the two brake shoes 4 and 5 have been inserted in the drum 3, to place the two brake shoes 4 and 5 towards the periphery 11 of the drum 3 out to a diameter 20 in a single operation that ensures that the two brake shoes 4 and 5 do not touch the periphery 11 of the drum 3. With a single application, the circle defined by the brake shoes 4 and 5 must take up a diameter 20 that is close enough to the periphery 11 of the drum 3 to ensure that braking occurs relatively immediately when the brakes are applied. When the abutment 34 comes against the inner rim 18 of the shoe 4 or against the inside of the opening 35, depending on which embodiment of the invention is involved, the drum brake is assembled with its operating clearance. When the abutment 34 is over the brake shoe 4, the drum brake is presented with its assembly clearance.

FIG. 3 also shows wear of the brake linings 19, with a step 39 being formed in the wall 12 of the drum 3 and with the two brake shoes spaced apart at the operating clearance 37 while the drum brake 1 is in use.

From the drum brake 1, it is possible to remove from the drum 3 together with the backing plate 2 an assembly 40 (cf. FIG. 3) mainly constituted by the brake shoes 4 and 5 carrying their brake linings 19. However, as the linings 19 rub against the periphery 11 of the drum 3 during successive braking operations, the brake linings 19, 19.1, and 19.2 become worn and smaller in thickness. The automatic adjustment device 28 takes up slack corresponding to a space 41 that results from this wear so as to maintain spacing that corresponds to the operating clearance 37. However, at the same time as the linings 19, 19.1, and 19.2 wear away, the linings 19 also dig into the wall 12 of the drum 3 each time they rub against it during braking. As a result, a step 39 becomes formed in the wall 12 of the drum 3. Because of the formation of this step 39 and because of the take-up of the slack 41 that results from the linings 19 wearing away, the assembly 40 enlarges to such an extent that it can longer be withdrawn from the drum 3.

The assembly and disassembly method of the invention makes it possible to solve this problem.

Figure 2A:
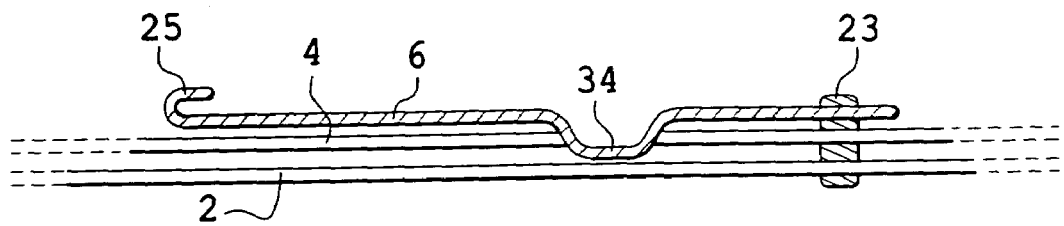
FIGS. 2a to 2c show steps in assembling and disassembling the drum brake of the invention.
Figure 2B:
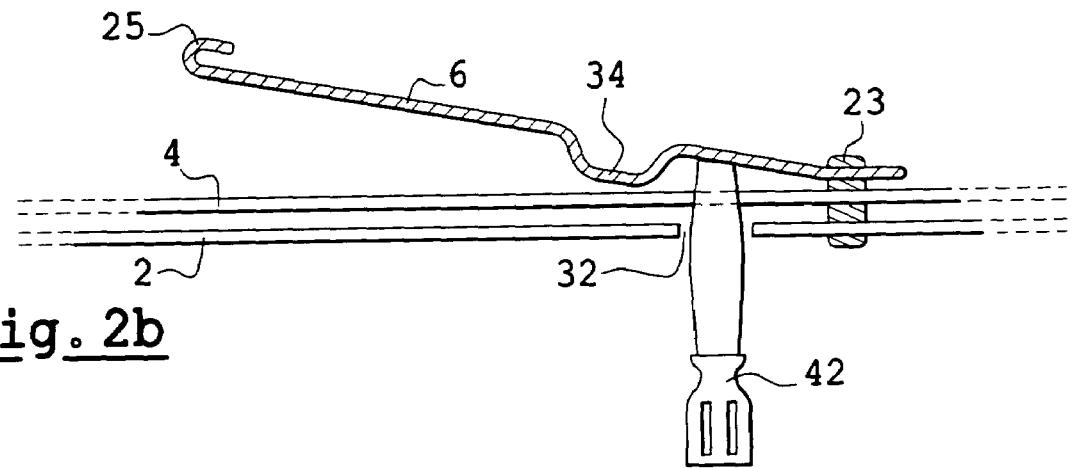
Figure 2C:
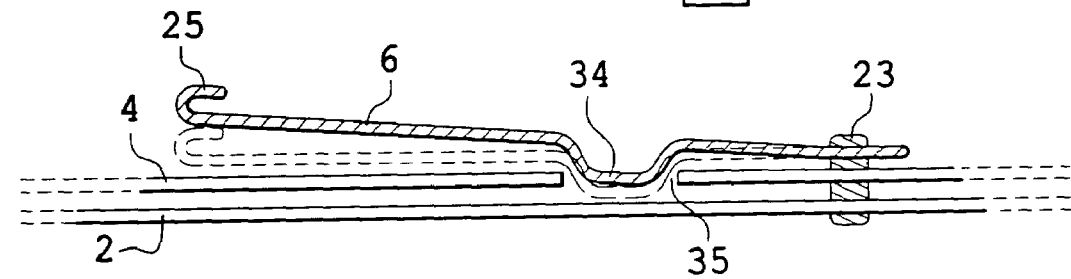

For the assembly method, it is possible in the factory to select the link 29 that corresponds to operating clearance 37 while the lever 6 is in the position B and the lever 21 is at the beginning of its slack take-up range. The spacing between the shoes 4 and 5 is adjusted by selecting the link 29. This selection can be performed by using a jig representing the shape of the drum 3. Thereafter, the hand-brake lever 6 is moved from position B to position A (FIGS. 1, 2a–2c). To reach position A, the hand-brake lever 6 is lifted from the brake shoe 4 on which the hand-brake lever 6 is hinged (FIG. 2b). This lifting produces a gap in a direction parallel to the axes of the hinges 23 and 24. For this purpose, the hand-brake lever 6 is pushed by means of a suitable tool, for example a screwdriver 42, from outside the backing plate 2 via the opening 32, thereby lifting the hand-brake lever 6 into the inside of the plate 2. Alternatively, it can be lifted from outside the drum 3 via the opening 33, with the hand-brake lever 6 being pulled by means of a tool having a hook. The hand-brake lever 6 is lifted until the abutment 34 lies over the shoe 4 (FIG. 2b). The hand-brake lever 6 is then pushed towards the outer rim 17 of the same shoe 4 via the inside of the drum 3 (FIG. 2).

In position A and when the lever 6 has been pushed as far as the outer rim 17, the hand-brake lever 6 is spaced apart from the fork of the link 29. The abutment 34 can no longer be placed inside the opening 35 or against the inner rim 18 of the shoe 4. The shoe 4 is thus released from the opening 35 and/or the abutment 34 and the fork of the link 29. The two shoes 4 and 5 can thus be pressed against each other. When pressed together in this way, the assembly clearance 36 is greater than the assembly clearance 38 that is normally available. The circle of diameter 20 defined by the two brake shoes 4 and 5 is determined by the link 29 and may be no more than a circle of diameter giving assembly 36 clearance greater than the usual clearance 38. The distance between a point on the periphery 11 of the drum 3 to a corresponding other point on the circle of diameter 20 when the hand-brake lever 6 is in position A is greater than when the hand-brake lever 6 is in position B. In position A, the two shoes 4 and 5 are thus pressed against each other while nevertheless potentially possessing pre-adjusted operating clearance 37. The two shoes 4 and 5 can then be assembled with a drum 3.

The two brake shoes 4 and 5 are thus inserted into the drum 3 while they are clamped together. Thereafter the hand-brake cable is connected to the hook 25 of the hand-brake lever 6. Then using the hand-brake cable which is pulled once only, the hand-brake lever 6 is positioned, moving the hand-brake lever 6 from position A to position B. Contrary to that described above with reference to FIGS. 2a to 2c, in order to go to position B, the hand-brake lever 6 is pushed towards the center of the drum 3 until the abutment 34 is blocked inside the opening 35 or until the abutment 34 is blocked against the inner rim 18 of the shoe 4 (FIG. 2b). It can be seen that a single operation suffices, unlike the twenty required in the prior art.

In accordance with the invention, the procedure for disassembly is as follows. The hand-brake lever 6 is initially lifted. This is done by performing the same steps as those described above with reference to FIGS. 2a to 2c. Using a screwdriver 42 and the opening 32, the hand-brake lever 6 which is initially in position B is pushed from behind the backing plate 2. Alternatively, using a hooked tool and the opening 33, the hand-brake lever 6 is pulled by acting through the opening 33. This moves the abutment 34 over the shoe 4 and out of the opening 35 (FIG. 2b). Thereafter the hand-brake lever 6 is pushed towards the outer rim 7 of the shoe 4 so as to bring the hand-brake lever 6 into position A (FIG. 2c). The two brake shoes 4 and 5 are moved towards each other to take up the assembly clearance 37 of the invention. The two shoes 4 and 5 are then in a position such that they are clear of the step 39 in the wall 12 of the drum 3. The two hand-brake shoes 4 and 5 contained in the assembly 40 can then be extracted from the drum 3.

The invention claimed is:

1. A drum brake (1) for a vehicle wheel having a backing plate (2), a drum (3), a first brake shoe (4), a second brake shoe (5), a hand-brake lever (6), a slack-takeup lever (21), a link (29) and spring means (30) wherein said first brake shoe (4) is connected to said second brake shoe (5) through said link (29), said hand-brake lever (6) is retained on a first hinge (23) on said first brake shoe (4) and said slack-takeup lever (21) is hinged (24) on said second brake shoe (5) and said slack-takeup lever (21) is connected to said hand-brake lever (6) through said link (29), and said spring means (30) acts to urge said first brake shoe (4) toward said second brake shoe (5), characterized in that said hand-brake lever (6) has an abutment (34) that engages the first brake shoe (4) to limit me movement of said first brake shoe (4) and said second brake shoe (5) toward each other by the spring means (30) to define a first diameter (20) for the first brake shoe (4) and second brake shoe (5) as established by the length of said link (29) to creates a desired operating clearance (37) between linings (19) associated with the first brake shoe (4) and second brake shoe (5) and a wall (12) on said drum (3) with the abutment (34) on the hand-brake lever (6) engaging the first brake shoe (4); and wherein said backing plate (2) has an opening (32) that is in axially alignment with the hand-brake lever (6) when the abutment (34) engages the first brake shoe (4); and wherein said hand-brake lever (6) responds to an axial input applied through said opening (32) by deflecting such that the abutment (34) is axially moved out of engagement with said first brake shoe (4) and the hand-brake lever (6) thereafter pivots on the first hinge (23) to allow said hand-brake lever (6) to move toward an inner rim (18) on the first brake shoe (4) such that the first brake shoe (4) is moveable toward said second brake shoe (5) to define a smaller second diameter for the first brake shoe (4) and the second brake shoe (5) and establish an assembly clearance (36) between the linings (19) and wall (12) of the drum (3).

2. The drum brake (1) as recited in claim 1 wherein said first brake shoe (4) is further characterized by an opening (35) that receives said abutment (34) on said hand-brake lever (6) pivoting about said first hinge (23) from a first position adjacent the inner rim (18) toward an outer rim (17) on the first brake shoe (4).

3. A method of assembling a drum brake (1) having a first brake shoe (4) spaced apart from a second brake shoe (5) by a link (29) wherein a hand-brake lever (6) is retained on the first brake shoe (4) through a first hinge (23) and connected through the link (29) to a slack-takeup lever (21) that is retained on the second brake shoe (5) by a second hinge (24), said link (29) having a length such that a first diameter (20) is created between the first brake shoe (4) and the second brake shoe (5) when an abutment (34) on the hand-brake lever (6) is urged into engagement with a surface (18) on the first brake shoe (4) by spring means (30) to define a sub-assembly, characterized by the following steps:

placing the sub-assembly in a fixture corresponding to a reference drum;

axially lifting the hand-brake lever (6) to move the abutment (34) out of contact with surface (18) on the first brake shoe (4) and thereafter pushing on the hand-brake lever (6) causing the hand-brake lever (6) to pivot on the first hinge (23) and move toward an outer rim (17) on the first brake shoe (4);

applying a first force to compress the first brake shoe (4) toward the second brake shoe (5) and reduce the first diameter (20) there between to define an assembly clearance (36);

placing the compressed sub-assembly on a brake backing plate (2) for a vehicle;

connecting a cable to the hand-brake lever (6);

pulling on said hand-brake lever (6) with a second force causing the hand-brake lever (6) to pivot on the first hinge (23) and move the abutment (34) past surface (18) the first brake show (4) such that the hand-brake lever (6) axially flexes with respect to the first hinge (23) and the abutment (34) engages surface (18) on termination of the second force with the spring means (30) acting on the first brake shoe (4) and second brake shoe (5) to urge the abutment (34) into engagement with surface (18) and re-establish the first diameter (20) and correspondingly an operating clearance (37) between linings (19) on the first (4) and second (5) brakes and the drum (3).

4. The method of assembling a drum brake (1) as recited in claim 3 wherein the step of axially lifting the hand-brake lever (6) occurs through an opening in the backing plate (2) and pushing the hand-brake lever (6) toward the outer rim (17) further includes the step of said abutment (34) being received by an opening (35) in said brake shoe (4) to retain the hand-brake lever (6) in a fixed position in defining the sub-assembly.

5. A method of removing a drum brake (1) from a backing plate (2) of a vehicle wheel wherein a first brake shoe (4) is spaced apart from a second brake shoe (5) by a link (29) and a hand-brake lever (6) is retained on the first brake shoe (4) by a first hinge (23) is connected by the link (29) to a slack-takeup lever (21) that is retained on the second brake shoe (5) by a second hinge (24) with a length of the link (29) defining an operating clearance (37) between linings (19) on the first (4) and second (5) brake shoes and a surface (11) on a drum (3) when an abutment (34) on the hand-brake lever (6) is urged into engagement with an inner rim (18) on the first brake shoe (4) by spring means (30), said engagement surface (11) after a period of time being worn and as a result a step (39) is created in the drum (3) that inhibits the removal of the drum (3) from the backing plate (2) comprising the steps of:

applying a first force through an opening (32) in the backing plate (2) to deflect the hand-brake lever (6) such that the abutment (34) is moved out of engagement with the inner rim (18) and thereafter applying a linear force to the hand-brake lever (6) causing the hand-brake lever (6) to pivot on the first hinge (23) and be moved toward an outer rim (17) on the first brake shoe (4); and thereafter, applying a second force to move the first brake shoe (4) toward the second brake shoe (5) to and reduce the diameter there between to define an assembly clearance (36) such that the drum (3) may be extracted from the backing plate (2).

6. The method of removing a drum brake (1) from a backing plate (2) as recited in claim 5 wherein the step of applying a linear force that causes the hand-brake lever (6) to pivot on the first hinge (23) is applied until the abutment (34) is received in an opening (35) in the first brake shoe (4) to thereafter hold the hand-brake lever (6) in a fixed position with respect the first brake shoe (4).

* * * * *